US 11,471,716 B2

(12) United States Patent
Cannas

(10) Patent No.: US 11,471,716 B2
(45) Date of Patent: Oct. 18, 2022

(54) FIREFIGHTING SYSTEM

(71) Applicant: John Cannas, Nicosia (CY)

(72) Inventor: John Cannas, Nicosia (CY)

(*) Notice: Subject to any disclaimer, the term of this patent is extended or adjusted under 35 U.S.C. 154(b) by 0 days.

(21) Appl. No.: 17/602,507

(22) PCT Filed: Apr. 14, 2020

(86) PCT No.: PCT/EP2020/060489
§ 371 (c)(1),
(2) Date: Oct. 8, 2021

(87) PCT Pub. No.: WO2020/208265
PCT Pub. Date: Oct. 15, 2020

(65) Prior Publication Data
US 2022/0152437 A1    May 19, 2022

(30) Foreign Application Priority Data
Apr. 12, 2019    (GB) ..................................... 1905249

(51) Int. Cl.
*A62C 3/02* (2006.01)
*A62C 31/00* (2006.01)
(Continued)

(52) U.S. Cl.
CPC .......... *A62C 3/0242* (2013.01); *A62C 3/0228* (2013.01); *A62C 3/0235* (2013.01);
(Continued)

(58) Field of Classification Search
CPC ... A62C 3/0228; A62C 3/0242; A62C 3/0235; A62C 31/005; A62C 33/04; B64D 1/18
(Continued)

(56) References Cited

U.S. PATENT DOCUMENTS 1,604,290 A * 10/1926 King .................... B64D 1/16
169/53
3,220,482 A * 11/1965 Eveleth ................ A62C 3/0242
169/53
(Continued)

FOREIGN PATENT DOCUMENTS

| EP | 0984816 B1 | 1/2003 |
| EP | 1775215 A1 | 4/2007 |
| WO | 0228708 A2 | 4/2002 |

OTHER PUBLICATIONS

Roger James, Revolutionary Robot Fireman, Sep. 9, 2016, Unifire/ automaticfirefighting.com, pp. 1-5. (Year: 2016).*

(Continued)

*Primary Examiner* — Steven J Ganey
(74) *Attorney, Agent, or Firm* — Ziegler IP Law Group, LLC

(57) ABSTRACT

Aspects of the disclosed embodiments relate to an aerial firefighting system for a helicopter, the firefighting system including: an external reservoir for storing water, wherein the reservoir includes a water outlet; a supporting frame coupled to an outer surface of the reservoir; and a moveable robotic nozzle fluidly connected to the water outlet and mounted on the supporting frame or attached to a hose reel for distributing water on a fire; wherein the moveable nozzle is operable by a user from within the helicopter to control the direction that the water is distributed.

22 Claims, 17 Drawing Sheets

SIDE VIEW

(51) Int. Cl.
*A62C 33/04* (2006.01)
*B64D 1/18* (2006.01)
(52) U.S. Cl.
CPC ............ *A62C 31/005* (2013.01); *A62C 33/04* (2013.01); *B64D 1/18* (2013.01)
(58) Field of Classification Search
USPC .... 169/16, 53; 239/171, 195–198, 302, 525, 239/587.1, 587.2, 588; 244/136
See application file for complete search history.

(56) References Cited

U.S. PATENT DOCUMENTS

| | | | | |
|---|---|---|---|---|
| 3,273,651 A | * | 9/1966 | Andrews | ............... A62C 3/0235 169/53 |
| 3,428,276 A | | 2/1969 | Hubbard | |
| 4,090,567 A | * | 5/1978 | Tomlinson | ............... B64D 1/16 169/53 |
| 7,407,116 B2 | * | 8/2008 | Lee | ............... B08B 3/026 239/171 |
| 2002/0079379 A1 | | 6/2002 | Cheung | |
| 2009/0078434 A1 | | 3/2009 | Archambault | |

OTHER PUBLICATIONS

PCT Demand for International Preliminary Examination (Chapter II) including Keltie Letter to EPO and Demand Claims, Application No. PCT/EP2020/060489, dated Feb. 12, 2021, 11 pages.
Keltie, Letter to EPO for Demand Correction, Mailed Mar. 31, 2021, 1 page.
Notification of Transmittal of The International Preliminary Report on Patentability, Application No. PCT/EP2020/060489, dated Jul. 6, 2021, 10 pages.

* cited by examiner

NOZZLE - SPRAY ANGLE 20DEG

FIREFIGHTING SYSTEM

TECHNICAL FIELD

The present disclosure relates to an aerial firefighting system and in particular but not exclusively to aerial firefighting systems on a helicopter or aeroplane for fighting forest fires. Aspects of the disclosed embodiments relate to an aerial firefighting system and to a helicopter.

BACKGROUND

Aerial firefighting systems are particularly effective when fighting fires in remote or hard to access areas. For example, helicopter firefighting systems are effective at combatting forest fires where ground firefighting crews cannot gain access to the local area. Furthermore, aerial firefighting systems may also be utilised to combat fires in skyscrapers that are inaccessible by ground crews using ladders.

Aerial firefighting systems are often mounted on helicopters and may comprise a fuselage mounted water tank or a membrane bucket suspended beneath the helicopter. The helicopter may then fly over the area of a fire and dispense water on the fire to extinguish it. Typically a blanket coverage approach is taken by the helicopter when dispensing water on a forest fire. The helicopter will fly over the area on fire and empty the contents of the tank on the area alight. However, this is an inaccurate and inefficient use of water within the tank of the helicopter and often leads to water being distributed on burnt out areas or areas that are not yet alight.

To improve the effectiveness of aerial firefighting systems it is therefore desirable to improve the accuracy of water distribution on the area on fire. Various parameters affecting the spread of forest fires are outlined below.

Progress rates of forest fires vary widely depending on the terrain the fire is burning on, including: the slope of the terrain, moisture content of the vegetation, vegetation type, density of vegetation and wind velocity and direction. Typical progress rates for forest fires vary from 2 m to 30 m per minute and as such forest fires can spread rapidly making it important to prevent the progress of a fire as quickly as possible.

To extinguish a forest fire it is well known to cover the area on fire with water. Water demand is the amount of water required in order to extinguish a typical forest fire and this varies widely depending on the same factors that affect the progress rate of a forest fire as outlined above. In areas of sparse vegetation the water demand may be as low as 0.4 $l/m^2$. However, in areas of heavy vegetation such as large bushes or tall trees this figure may be up to 20 $l/m^2$.

Water coverage is the density of the firefighting water actually applied on the ground surface. Water coverage is affected by wind and helicopter velocities, water volume, discharge period, the slope of the terrain and altitude of the helicopter.

Water volume and discharge period is the bucket or tank volume and time during which the helicopter bucket or fuselage tank are emptied. Typically, the bucket or fuselage tank are discharged through a large diameter orifice to distribute a large amount of water quickly on an area. The tank may be emptied within about 5 seconds.

The tank may be filled by a suction hose suspended from the helicopter. When the tank requires refilling the helicopter may hover above a reservoir, for example a lake or river, and suck water into the tank via the suction hose. This is beneficial as the tank may be quickly refilled in remote locations from water sources local to the fire. Membrane buckets are refilled by direct immersion in reservoirs or the sea.

There are various ways in which the helicopter may then distribute the water on the fire. Most commonly the helicopter will fly over a fire and empty the contents of the tank or bucket in the area of the fire in a bid to extinguish the fire. The average water tank will take in the region of five seconds to empty However, distributing a large volume of water rapidly on a fire is not particularly effective at suppressing it. The effectiveness of a firefighting system may be influenced by factors such as wind velocity which may cause the water to drift. Strong winds or variable winds lead to very low effectiveness as the water may be blown away from the fire as it is distributed by the helicopter. Furthermore, factors such as poor visibility, discharge altitude, pilot training, equipment capacity and fire intensity may further reduce the effectiveness of the firefighting system.

The effectiveness of a firefighting system may be improved by improving the accuracy of placement of the water on the fire and also by improving the coverage of water on the fire.

Firefighting systems associated with the prior art will now be discussed in further detail below.

The Simplex Aerospace USA, Fire Attack System is an example of an aerial firefighting system comprising a fibreglass tank mounted on the underside of a helicopter. The tank may rapidly empty water on a fire or may use a spray gun to direct water into a high-rise building that is on fire.

The Sikorsky-Ericson Air Crane is another example of a helicopter fitted with a tank. The tank is incorporated into the fuselage of the helicopter and water may be distributed on a fire through a large opening on the underside of the tank. However, the water may not be targeted or aimed thus the placement of the water is not very accurate thereby reducing the effectiveness of the system.

The Bambi Bucket System is an example of a membrane bucket suspended from a helicopter. The membrane bucket is fully collapsible for easy transportation and for quick filling via submersion. Water is emptied from the bucket via a large orifice located on the base of the bucket, however, water being expelled from the bucket may not be aimed and is thus subject to drift and thus poor placement on the fire.

Helifire New Zealand Buckets and Aerial Fire Control water buckets are further examples of membrane buckets for use with an aerial firefighting system.

US 2009/0078434 is an example of an aerial firefighting system comprising a cylindrical tank suspended from a helicopter for fighting fires in tall buildings. The system is required to be powered by the helicopter thus making it unsuitable for use with helicopters that are unable to provide electrical power to the firefighting system.

US 2002/0079379 describes a custom made water container that can only be used with the system described in US 2002/0079379 and cannot be retrofitted on the existing Bambi bucket or fuselage tank systems. Furthermore, this system has no aiming capability at different targets within the fire zone, will produce a spray pattern that will cover a width based on the sprinkler type and helicopter height covering areas that may or may not need the water. Since a helicopter is not able to change heights rapidly during a firefighting operation the effectiveness and accuracy of this system would be quite low, especially in cases of patchy fires over long fire fronts. The accuracy of this system is further reduced by the lack of nozzle control to enable aiming, rain or jet effect depending on the fire target.

The long lengths of freely suspended pipes under the bucket form a serious safety hazard and cause helicopter crews to have serious objections for the utilization of this system. For example, the long, loose flexible hydraulic lines are not stabilized and will sway with wind gusts and helicopter movement, very possibly getting entangled and leading to non-uniform fire coverage and water wastage. The idea of combining two helicopters to carry the hose is completely impractical and dangerous. The effectiveness of this system would be quite low especially in cases of patchy fires over long fire fronts.

System has been considered as impractical by the industry, therefore never implemented. Furthermore, this system does not have a camera to monitor and/or facilitate the firefighting operation by interlocking it with the nozzle.

EP 0984816 describes an aerial firefighting system. The system requires a custom made water container with a support frame underneath to land the system on the ground and a built-in hosereel, that can only be used with this system. This system cannot be retrofitted on the existing Bambi bucket or fuselage tank systems. The single layer spooling hosereel and landing frame increase the height of the system thus requiring deeper water reservoirs to refill the bucket.

This system does not have remote control nozzle aiming capability at different targets within the fire zone, therefore the system will cover areas that may or may not need the water. Furthermore, the system does not have a remote nozzle control to enable rain or jet effect depending on the fire target. This system is ineffective and wasteful of water thereby reducing the overall effect of the system when fighting fires.

The effectiveness of aerial firefighting systems depends on the accurate placement of water on the fire. In other words the accurate application of water at the required places within a large area that is on fire. Furthermore, effectiveness is maximised by the coverage of the maximum possible area on fire with the correct water quantity to match the water demand with the water coverage for the maximum area, thereby achieving the most efficient utilisation of the available water volume.

The effectiveness of an aerial firefighting system may be measured by the result of the Suppression Drop on the Fire Behaviour. A 100% effective Suppression Drop means that all of the available water was accurately applied as determined by the water demand requirements of the different parts of a fire zone resulting in the elimination of the fire in the maximum possible area.

Firefighting systems associated with the prior art have a typical discharge period of 5 seconds and fly at a typical helicopter speed of 50 km/hr and at a height of 50 m. This leads to a coverage area of about 70 m in length and 20 m width, assuming zero wind velocity which is rarely the case. Assuming uniform distribution, this results in a water coverage of 2.2 l/m$^2$ for a 3000 litre bucket or 3.6 l/m$^2$ for the 5000 litre bucket. This coverage is satisfactory in some cases, for example, for a continuous front, uniform width fire in a dense forest or at the very early stages of a fire, where the whole width of the fire zone must be attacked.

However, this is rarely the case as fires tend to have narrow fronts and are often "spotty" with pockets of intense fire or very little fire spread over much larger areas. This is particularly the case where the forests are not so dense or are particularly patchy. Therefore, the current average water coverage figures are quite high when compared to the actual average water demand requirements of typical forest fires. Furthermore, a substantial amount of water dropped by current systems is blown off target by wind and thus falls on areas which do not require any water coverage.

It is estimated that the Suppression Drop effectiveness of current firefighting techniques is very low, for example about 15%.

The lack of ability to aim, shape and control the volume of the water jet severely limits the area covered and the effectiveness of the operation resulting in a lot of the water being wasted in the current firefighting techniques.

It is an aim of the present disclosure to address one or more of the disadvantages associated with the prior art.

SUMMARY

The proposed disclosed embodiments may be supplied as a completely new system or it may be retrofitted to existing aerial firefighting systems without affecting their operation. For example, existing aerial firefighting systems may be adapted to include features of the present disclosure.

According to an aspect of the present disclosure there is provided an aerial firefighting system for a helicopter, the firefighting system comprising: an external reservoir for storing water, wherein the reservoir comprises a water outlet; and a nozzle fluidly connected to the water outlet; wherein the nozzle is suspended by a fluid conduit in fluid communication with the water outlet and the nozzle such that water being expelled from the nozzle is under hydrostatic pressure from water within the reservoir and wherein the nozzle is moveable relative to the reservoir to direct a flow of water from the nozzle to a target site. A supporting frame may be coupled to an outer surface of the reservoir.

Beneficially, the supporting frame coupled to the outer surface of the reservoir allows the system to be retrofitted to an existing reservoir without protruding below it, thus not affecting landing of the reservoir. The moveable nozzle allows the flow of water to be targeted on a target site, for example a forest fire. This improves the overall effectiveness of the firefighting system by providing a targeted water distribution such that the water may be distributed to the area of the fire most in need of the water.

Furthermore, suspending the nozzle from the fluid conduit, for example a flexible hose, advantageously allows the helicopter to fly higher above the forest fire thus making it safer for the crew of the helicopter. Suspending the nozzle below the reservoir allows the hydrostatic pressure of water within the reservoir to pressurise the water being expelled from the nozzle. This is advantageous especially in the cases of helicopters that do not have a power supply suitable for providing power to the firefighting system as it negates the requirement for a pump to be fitted to the firefighting system to pressurise the water.

In an embodiment the nozzle may be mounted within a stabiliser housing or an aerodynamic housing. This is beneficial as the aerodynamics of the housing ensure that the nozzle is held substantially stable during flight and water distribution such that water may be accurately distributed on the fire.

In another embodiment the stabiliser housing may comprise at least one fin or aerofoil. The fin or aerofoil beneficially supports the housing in flight to maintain a steady and stable flight. This advantageously maintains the nozzle steady during flight.

In an embodiment the fluid conduit may be retractable. For example, the fluid conduit may be moveable between a deployed position in which the conduit is lowered for delivering water to a target site and a retracted or stowed position in which the conduit is retracted and stored.

In another embodiment the firefighting system may comprise an externally mounted hose reel for winding and unwinding the hose. The fluid conduit may be a flexible hose and the hose reel may be configured to wind and unwind the hose between a stowed position and a deployed position. This is advantageous as the hose may be deployed when the helicopter is over a fire such that water from the reservoir may be distributed on the fire and then stowed or wound during normal flight.

In one embodiment the reservoir may comprise a flexible membrane or a fuselage tank and the hose reel may be mounted on a supporting frame coupled to the reservoir. A horizontal rotational axis of the hose reel may be moveable or tiltable relative to the reservoir when the hose is being wound so as to distribute the hose evenly across the reel during winding. The supporting frame may be coupled to a lower edge and an upper edge of the reservoir without protruding below the reservoir. The supporting frame may be coupled to the reservoir via flanges having curved grooves that allow movement of the horizontal rotational axis of the hose reel when the hose is being wound.

In one embodiment the hose and support frame may comprise an alignment or guide system. The firefighting system may comprise an alignment system for controlling the hose during spooling. This is advantageous as the alignment/guide system allows self spooling of the hose during the winding/unwinding actions and helps to align the stabilizer housing with the helicopter flight path when the hose reel is wound up before and after the firefighting operation.

In an embodiment the alignment system may comprise a guide tube disposed around the flexible hose and the guide tube may be moveably mounted on a guide frame. The guide frame may be pivotally mounted to the supporting frame. The guide tube may comprise a location formation configured to engage a corresponding formation on the housing to inhibit rotational movement of the housing when in the stored position. The location formation may comprise a pair of vanes positioned within the guide tube and the corresponding formation on the housing may comprise a pair of tabs configured to follow a guide path defined between the pair of vanes.

In an embodiment the supporting frame may be coupled to a lower edge and an upper edge of the reservoir without protruding below it, thus not affecting landing of the reservoir. This advantageously ensures the supporting frame is securely coupled to the reservoir and further provides structural support to the reservoir. The supporting frame may be any shape to fit the reservoir. For example, the supporting frame may be circumferential if the reservoir is a circular membrane bucket or the supporting frame may be rectangular if the reservoir is an externally mounted fuselage tank.

In another embodiment the nozzle may be a moveable nozzle that is moveable relative to the hose about intersecting vertical and horizontal axes. The moveable nozzle may be a robotic nozzle similar to the Unifire Robotic nozzle or a custom made Rainmaker nozzle. The Rainmaker nozzle is an example of a high flowrate nozzle that may spray water droplets on the target site. For example, the Rainmaker nozzle may deliver up to about 60 litres per second or more of water droplets on a target site. The moveable nozzle may be operable from within the helicopter.

In one embodiment one or more fluid control valves may be operable to control the flowrate of water. This advantageously enables a pilot of the helicopter to vary the amount of water being distributed on a fire, substantially reduces water wastage and also allows the discharge period to be varied depending on the fire that is being combatted, thus maximizing coverage over large fire zones. The system may comprise at least one, optionally two, flow control valves operable to control the flowrate of water. A control valve may be positioned at the outlet of the reservoir and another valve may be positioned proximal to the nozzle. This is beneficial as it allows the flowrate of water to be controller rapidly and prevents water within the hose being wasted.

In an embodiment the at least one flow control valve may be positioned at a distal end of the hose or at a proximal end of the hose. In an embodiment there may be a flow control valve positioned at each end of the hose.

In one embodiment a perforated plate may extend across a distal opening of the nozzle. A longitudinally moveable pin or actuator may act on the perforated plate. The pin may be moveable relative to the nozzle to manipulate the perforated plate. The pin may act on the perforated plate such that moving the pin longitudinally relative to the nozzle changes the orientation of at least a portion of the perforated plate relative to the nozzle. A perimeter portion of the plate may be fixed relative to the nozzle and a central portion of the plate may be manipulated by the longitudinal movements of the pin to vary the distribution or spray pattern of the flow of water. The pin may act on the plate to deform at least a portion of the plate.

In another embodiment the perforated plate may comprise two or more segments moveable relative to each other under the action of the pin. The plate may comprise four segments moveable relative to each other under the action of the pin. The plate may be a metal plate, for example a steel plate, or the plate may be made from a rubberised material reinforced by a metal, such as steel.

In another embodiment the moveable nozzle may be operable to control a distribution pattern of the water. For example, the nozzle may distribute the water as a jet on the fire or as a rain effect depending on the application. This is beneficial as it allows the pilot or fire fighter to control the water coverage from inside the helicopter.

In an embodiment the firefighting system may comprise a camera for displaying an image of the fire on a screen on the control panel within the helicopter. This is beneficial as it provides a clear view of the fire below the helicopter to occupants within the helicopter thereby providing a view of where the water is being distributed relative to the fire. This may also allow the pilot or fire fighter to vary the flow rate or distribution pattern of the water from the nozzle as required when combatting the fire.

In another embodiment the camera and nozzle may be interlocked and aimed simultaneously through cross hairs on the screen. This is advantageous as the operator of the control panel may be provided with instantaneous feedback as to the position the nozzle is pointing relative to the fire thereby making it easier for them to target the water on the area of the fire most in need of water.

In one embodiment, the reservoir may be a membrane bucket suspended beneath the helicopter. In another embodiment, the support frame may comprise a camera for monitoring the fire and/or the direction that the nozzle is pointing. In one embodiment the camera may move as the nozzle moves such that the nozzle and the camera are interlocked thereby aiming at the same target.

According to a further aspect of the present disclosure there is provided an aerial firefighting system for a helicopter, the firefighting system comprising: a membrane bucket reservoir for storing water, wherein the membrane bucket comprises a water outlet; a supporting frame coupled to an outer surface of the membrane bucket; and a moveable nozzle fluidly connected to the water outlet and mounted on the supporting frame for distributing water on a fire; wherein the moveable nozzle is operable by a user from within the helicopter to control the direction that the water is distributed.

This is advantageous as the supporting frame allows the aerial firefighting system to be fitted to existing membrane buckets such that the water distribution of the membrane bucket may be targeted on a fire. In an embodiment the supporting frame may be coupled to the outer surface of the membrane bucket without protruding below it. This is beneficial as it allows the helicopter to land without potentially damaging the supporting frame.

According to another aspect of the present disclosure there is provided an aerial firefighting system for a helicopter, the firefighting system comprising: an external reservoir for storing water, wherein the reservoir comprise a water outlet; a moveable nozzle fluidly connected to the water outlet; wherein the nozzle comprises a perforated plate extending across a distal opening of the nozzle; and a longitudinally moveable pin acting on the perforated plate wherein the pin is moveable relative to the nozzle to manipulate the perforated plate to vary a distribution pattern of a flow of water from the nozzle.

According to a yet further aspect of the present disclosure there is provided a helicopter comprising the aerial firefighting system as outlined in any one of the aforementioned aspects and embodiments.

Within the scope of this application it is expressly intended that the various aspects, embodiments, examples and alternatives set out in the preceding paragraphs and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the present disclosure will now be described, by way of example only, with reference to the accompanying drawings, in which.

DETAILED DESCRIPTION

In general terms embodiments of the present disclosure relate to an aerial firefighting system. The aerial firefighting system may be retrofitted on existing aerial firefighting systems that comprise a reservoir such as a fuselage mounted tank or a suspended membrane bucket. This is advantageous as the system may be easily fitted to existing firefighting helicopters to increase the efficiency of their firefighting ability without making significant modifications to the existing systems.

The aerial firefighting system comprises a support frame for coupling the water dispensing system to an external surface of the reservoir and a moveable nozzle. The moveable nozzle is fluidly coupled to the reservoir by a pipe system and may be mounted on the support frame or suspended beneath the reservoir. The moveable nozzle beneficially allows a pilot or fire fighter located within the helicopter to aim the water being distributed by the nozzle. Furthermore, the nozzle is operable to control the distribution pattern of the water from a jet of water to a rain effect or spray depending on the application.

This is beneficial as the nozzle may distribute the water in a targeted manner on a fire thereby ensuring that the water distributed from the reservoir is used in as effective a manner as possible. The nozzle may be a moveable or robotic nozzle controllable from within the helicopter.

Figure 1:
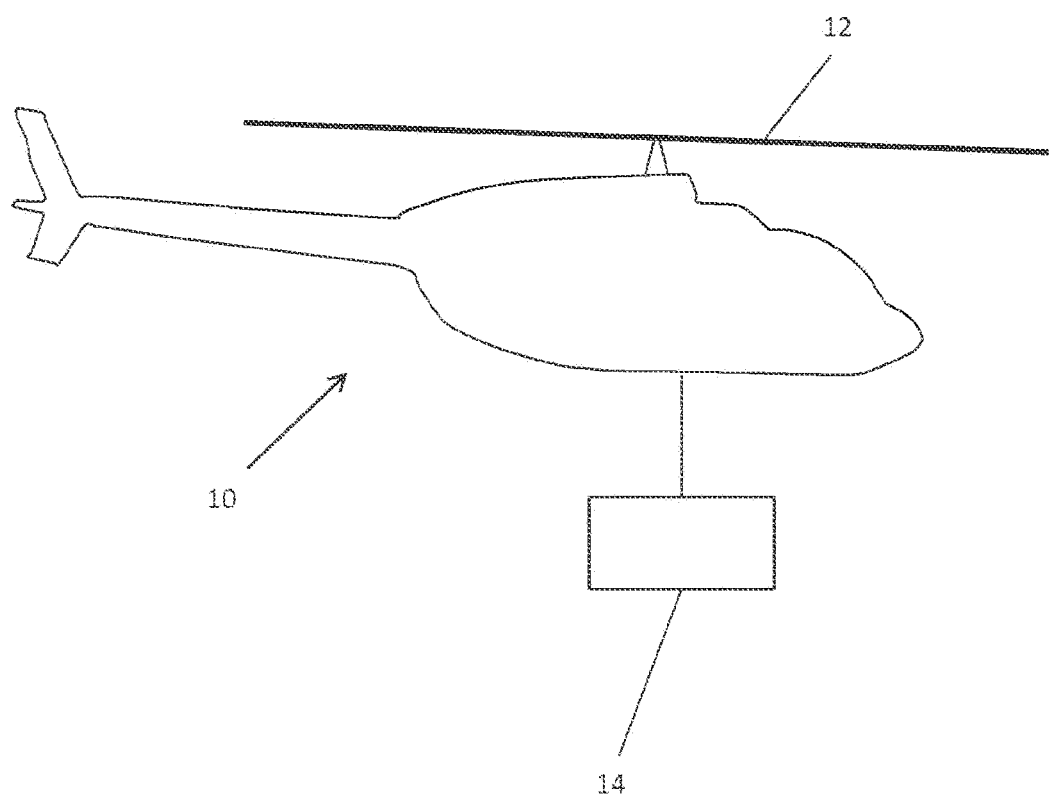
FIG. 1 is a schematic view of a helicopter and a firefighting system suitable for use with embodiments of the invention.

To place embodiments of the present disclosure in a suitable context, reference will firstly be made to FIG. 1 which shows a schematic image of a helicopter 10. The helicopter 10 is suitable for use with an aerial firefighting system. The helicopter 10 comprises a firefighting system 14 suspended beneath the helicopter 10. The firefighting system 14 comprises a reservoir for storing water such as a membrane bucket suspended beneath the helicopter or a fuselage tank mounted on the external surface of the helicopter 10.

Figure 2:
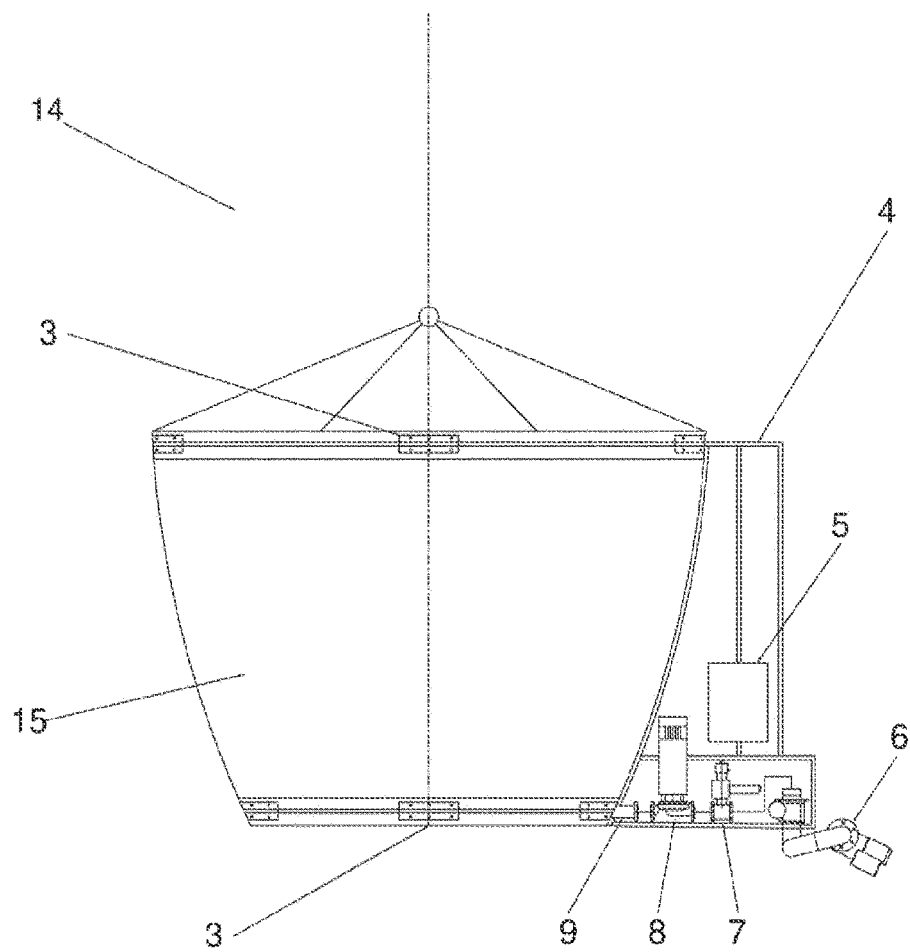
FIG. 2 is a schematic of the firefighting system of FIG. 1.

FIG. 2 shows a schematic view of the firefighting system 14 according to an embodiment of the present disclosure. The firefighting system 14 comprises a reservoir 15, for example a membrane bucket or a fuselage mounted tank, for storing water. A supporting frame 4 is connected to the external surface of the reservoir 15 by a clamping means such as the clamping plate 3. As shown in FIG. 2, the supporting frame 4 extends around the lower and upper perimeter of the reservoir 15. This is beneficial as the supporting frame 4 securely attaches the firefighting system 14 to the reservoir 15 and allows components of the firefighting system 14 to be mounted to the supporting frame 4. Furthermore, the supporting frame 4 does not protrude beneath the lower perimeter of the reservoir 15 such that when landing the base of the reservoir 15 contacts the ground so as not to put the weight of the reservoir 15 through the supporting frame 4.

The skilled reader will understand that the supporting frame 4 may be dimensioned to suit the type of reservoir 15 that the supporting frame 4 is being secured to. For example, FIG. 2 illustrates a membrane bucket reservoir 15 and as such the supporting frame 4 is circumferential around the lower and upper edges of the membrane bucket. However, in another example the reservoir 15 may be a fuselage mounted tank which may be a different shape in which case the supporting frame would be dimensioned accordingly.

A moveable nozzle 6 is mounted on the supporting frame 4. The nozzle 6 is fluidly connected to the reservoir 15 and is configured to distribute water from the reservoir 15 on the fire. The moveable nozzle 6 is remotely controllable by a pilot or fire fighter from within the helicopter 10 to direct the distribution of water on a targeted area. This is beneficial as the water within the reservoir 15 may be distributed on the fire in a controlled and targeted manner to ensure that the water is distributed on the fire in the area most in need of it.

A pump 8 is located between the nozzle 6 and the reservoir 15. A flanged leak proof 100 to 150 mm pump inlet connection 9 connects the outlet of the reservoir 15 to the pump 8 and nozzle 6. The pump 8 may be a submersible or an in-line pump 8 and is configured to pump water from within the reservoir 15 to the nozzle 6 such that the water from within the reservoir 15 may be pressurised and expelled from the nozzle 6.

The reservoir 15 of the firefighting system 14 may be refilled by submersion in a body of water, for example a river, lake or the sea. As such, the components of the firefighting system 14 are water proof to IP67 such that they may be submerged without damaging any of the components of the system 14.

The firefighting system 14 further comprises a quick response variable flow control valve 7 located between the pump 8 and the nozzle 6. The variable flow control valve 7 may be operated to adjust the flow rate of water expelled from the nozzle 6. This is beneficial as the flow rate of water being expelled from the nozzle 6 may be varied depending on the type of fire the water is being sprayed on. For example, the flow rate of water may be varied from between 0 l/s and about 50 l/s as required to combat the fire. The valve 7 may be positioned proximal to the nozzle 6 such that operating the valve 7 provides a rapid response at the nozzle 6 thereby reducing water wastage.

Furthermore, the nozzle 6 may be controlled to vary a distribution pattern of water from the nozzle 6. For example, the nozzle 6 may expel water in the form of a jet to target a focussed area on fire or alternatively the distribution pattern may be a rain effect to cover a larger area of the fire. The distribution pattern is varied by a sliding pin or the like located within the moveable nozzle 6. Various nozzle outlets may be fitted on the nozzle 6 through a threaded connection. In one nozzle type, which is the current industry standard, the sliding pin may be actuated to impede the flow of water leaving the nozzle 6 to vary the distribution pattern. When the sliding pin is extended outwards the pattern is a jet. When fully inserted into the nozzle 6 the distribution pattern is wider. In another custom made nozzle type the sliding pin may move inward or outward the front perforated plate which can be a steel reinforced 10 mm thick rubber membrane with approximately 800 holes of 3 mm diameter to provide a rain effect with 30 litre/sec flowrate varying in angle from zero to thirty degrees.

Figure 3:
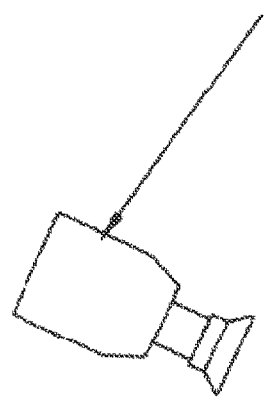
FIG. 3 is a camera for use with the helicopter and firefighting system of FIG. 1.

As shown in FIG. 3, the firefighting system 14 may also comprise a camera 2. The camera 2 is configured to capture images of the fire zone that the nozzle 6 is targeting such that an image of the area may be displayed to a pilot or fire fighter positioned within the helicopter 10. The camera 2 may be mounted on the helicopter 10 frame so that it can provide a wide angle view of the fire zone. Furthermore, mounting the camera 2 on the helicopter 10 provides a view of the fire zone that is unobstructed by the wide angle jet from the nozzle 6. The camera 2 and nozzle 6 may be interlocked and operable from one joystick controller or controlled separately. A display within the helicopter 10 may show crosshairs to enable accurate aiming of the nozzle 6.

Figure 4:
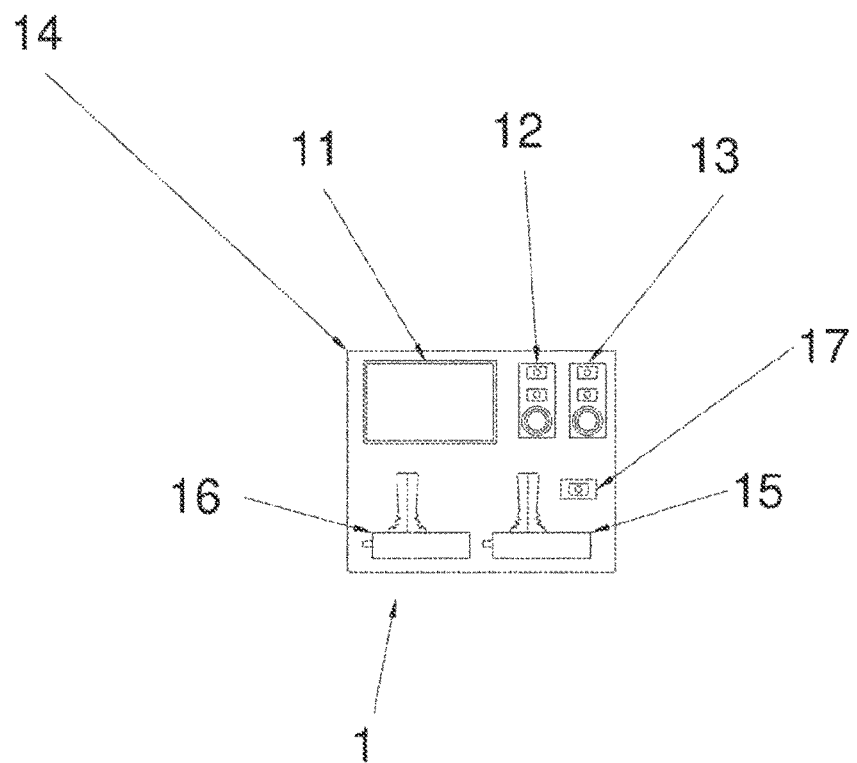
FIG. 4 is a view of a controller for controlling the firefighting system of FIG. 2.

FIG. 4 shows a schematic of a control panel 1 located within the cabin of the helicopter 10. The control panel 1 comprises a display 11 for displaying information indicative of the firefighting system 14 to a user of the helicopter 10. Furthermore, the control panel 1 comprises switches 12, 13 for operating the pump 8 and the variable flow control valve 7, switch 14 for the nozzle jet or spray control, and 15, 16 for the camera and nozzle direction control. The control valve 7 may be operated remotely to vary the flow rate of water out of the nozzle 6. The pump 8 may also be operated to vary the pressure of the water and thus the distance the water is being sprayed from the nozzle 6 by operating the control panel 1.

The firefighting system 14 may be powered by the helicopter 10. This is beneficial as the helicopter 10 may provide power to the pump 8 and to the moveable nozzle 6. This allows the moveable nozzle 6 to be articulated remotely from the helicopter 10 such that the water may be targeted on the fire. Cables (not shown) are run from the helicopter 10 to the firefighting system 14. The cables may deliver power to the firefighting system 14 from the helicopter's on-board power supply. Furthermore, the cables may be connected to the control panel 1 within the helicopter 10 such that a pilot or fire fighter may control the firefighting system 14 from the helicopter. The skilled reader will understand that the firefighting system 14 may also be controlled wirelessly from within the helicopter 10.

Figure 5:
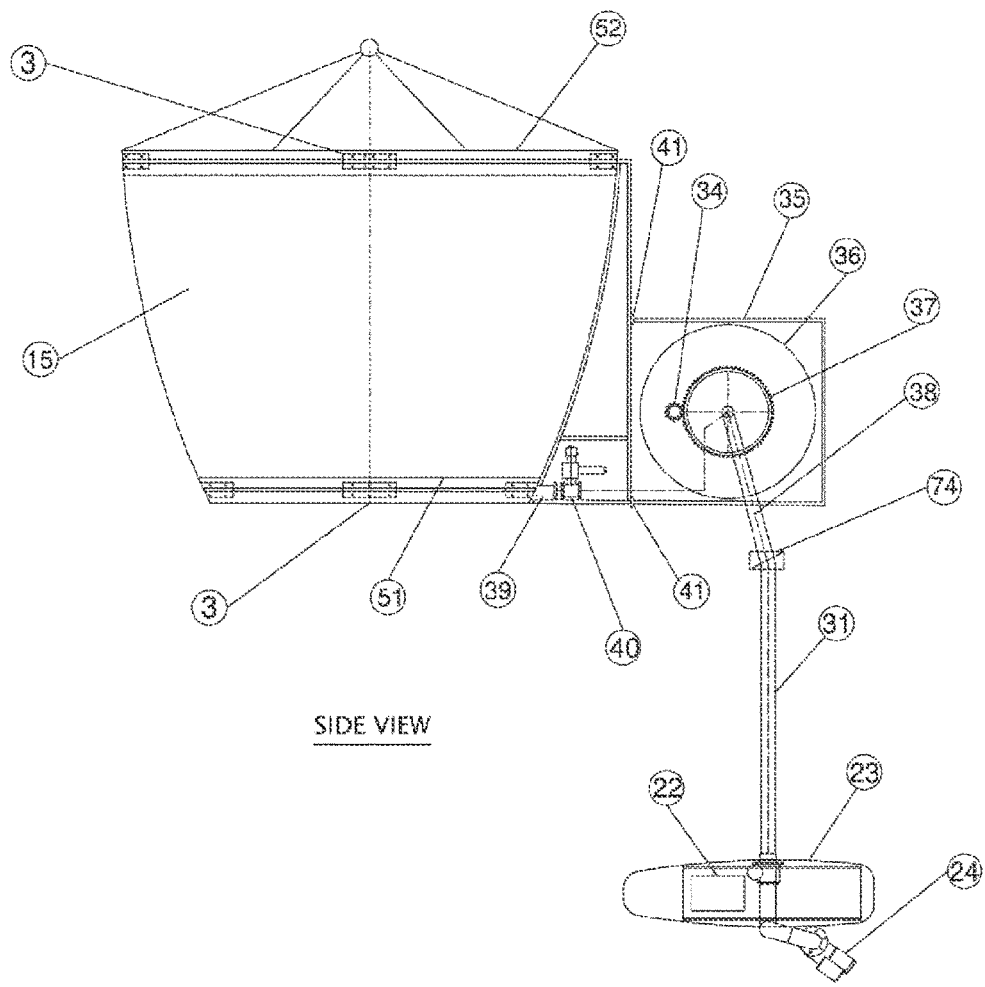
FIG. 5 is a schematic side view of a firefighting system comprising a hose in a deployed position suitable for use with embodiments of the invention.
Figure 6:
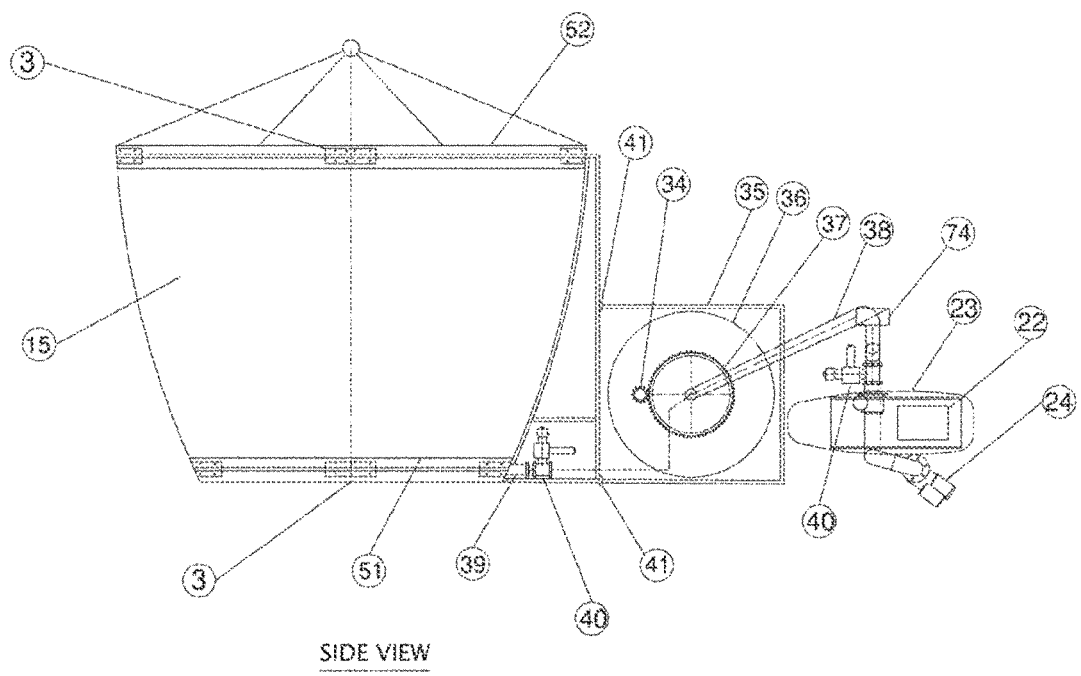
FIG. 6 is a schematic side view of the firefighting system of FIG. 5 in a stowed position.
Figure 7:
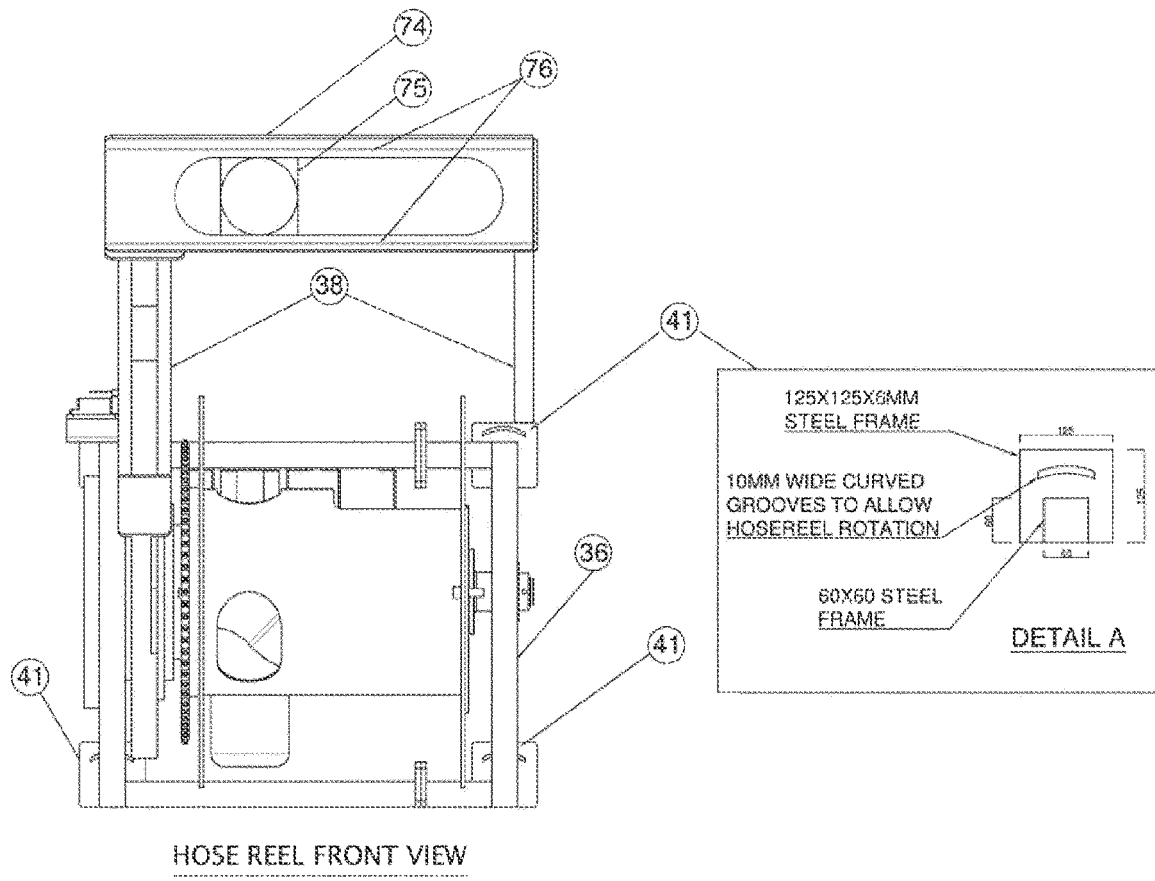
FIG. 7 is a schematic front view of a hose reel of the firefighting system of FIG. 5 suitable for use with embodiments of the invention.

FIGS. 5 to 7 show a firefighting system 14 according to an alternative embodiment that may be utilised in cases of helicopters without an available power supply suitable for providing power to the firefighting system 14. The firefighting system 14 is controlled from a suitable control panel similar to FIG. 4 (not shown). The embodiment shown in FIGS. 5 to 7 is not powered by the helicopter's 10 power system but through a 24V DC rechargeable battery pack carried on board the firefighting system 14 within a custom water-proof case. The water pressure expelled from the nozzle 24 is generated by hydrostatic pressure from water within the reservoir 15.

The firefighting system 14 comprises a flexible hose 31 that is moveable between an unwound position as shown in FIG. 5 and a wound position as shown in FIG. 6. The flexible hose 31 fluidly connects the nozzle 24 to the reservoir 15. The flexible hose 31 suspends the nozzle 24 below the height of the reservoir 15 to create a pressure differential such that fluid may be expelled from the nozzle 24 without the requirement of a pump to increase the pressure of the fluid. This is beneficial for use on helicopters 10 where the power system of the helicopter 10 is not suitable for providing power to a pump for pressurising the fluid in the reservoir 15 prior to expulsion. In an example, the flexible hose 31 may be between 30 m and 40 m in length thereby creating a pressure of 3 bar to 4 bar at the nozzle 24.

Furthermore, suspending the nozzle 24 between 30 m and 40 m below the reservoir 15 further distances the nozzle 24 from the downdraft of the rotor 12 of the helicopter 10. This is beneficial as it improves the stability of the nozzle 24 thereby improving the accuracy of the water distribution and it also beneficially reduces the effect the downdraft from the rotor 12 has on the jet of water being expelled from the nozzle 24. The skilled reader will understand that the hose 31 may vary in length depending on the application. Furthermore, suspending the nozzle below the helicopter allows the helicopter 10 to fly higher above a forest fire thereby improving the visibility and safety of the pilot within the helicopter 10. This also allows the helicopter 10 to fly at lower speeds above the fire to achieve accurate and in case of more intense fire pockets, persistent application of the water jet leading to effective firefighting.

A supporting frame 35 is attached to a lower and upper edge of the reservoir 15 by perimeter clamps 3. The frame 35 comprises lower and upper supporting members 51, 52 configured to extend around lower and upper edges of the reservoir 15 respectively. This beneficially achieves secure attachment of the supporting frame 35 to the reservoir 15 and may also provide additional structural support to the reservoir 15.

The supporting frame 35 further comprises a hose reel 36 for winding or unwinding the hose 31. An electric drive means, such as an electric motor 34, is configured to drive the hose reel 36 when winding or unwinding the hose 31. The hose reel 36 comprises gear teeth 37 arranged circumferentially and configured to engage a corresponding drive gear on the electric motor 34.

FIG. 7 shows a front view of the hosereel 36. The hosereel 36 has two side frames 38 which support and guide the hose 31 and aerodynamic housing 23. The frames 38 can rotate from about 150 degrees from the vertical axis when the hose is unwound as shown in FIG. 5, to about 30 degrees when the hose is wound as shown in FIG. 6. The frames 38 also support the guide/alignment system 74 as shown in detail in FIG. 9.

The supporting frame 35 is attached to the reservoir frame through the four flanged plates 41 which incorporate curved grooves to enable rotation of the frame 35 and hosereel 36 by a few degrees in either direction from the vertical axis. Rotating the hosereel 36 when winding the hose 31 beneficially ensures the hose 31 is spooled across the entire surface of the hosereel 36. This will result in self spooling of the hose 31 on the hosereel 36 so that it will not wind in one layer but all along the width of the hosereel 36. This reduces the hosereel 36 diameter and consequently it's inlet connection height, thus resulting in less water retention in the reservoir 15 at the end of the operation and allowing the bucket and frame to be landed evenly on the ground.

The firefighting system 14 comprises a fluid control valve 40 for controlling the flow of water from the reservoir 15 to the nozzle 24. The fluid control valve 40 may be controlled from within the helicopter 10 such that the flow of water from the nozzle 24 may be controlled.

FIG. 6 shows another embodiment of the firefighting system 14 where a second fast response fluid control valve 40 is located on the flexible pipe 31 above the aerodynamic housing 23. Locating a fluid control valve on the hose 31 is beneficial as it enables a quicker response at the nozzle 24 as there is no lag associated with water discharge from within the hose 31. When fighting fires over long fronts which necessitate multiple start/stop operations, it also reduces drastically the water wastage from within the hose which is 300 litre for a 30 m long, 100 mm diameter hose ie 10% of the overall capacity of the standard membrane bucket, thus improving substantially the firefighting effectiveness. The skilled reader will appreciate that there may also be one fluid control valve 40 located at the housing 23.

Figure 8:
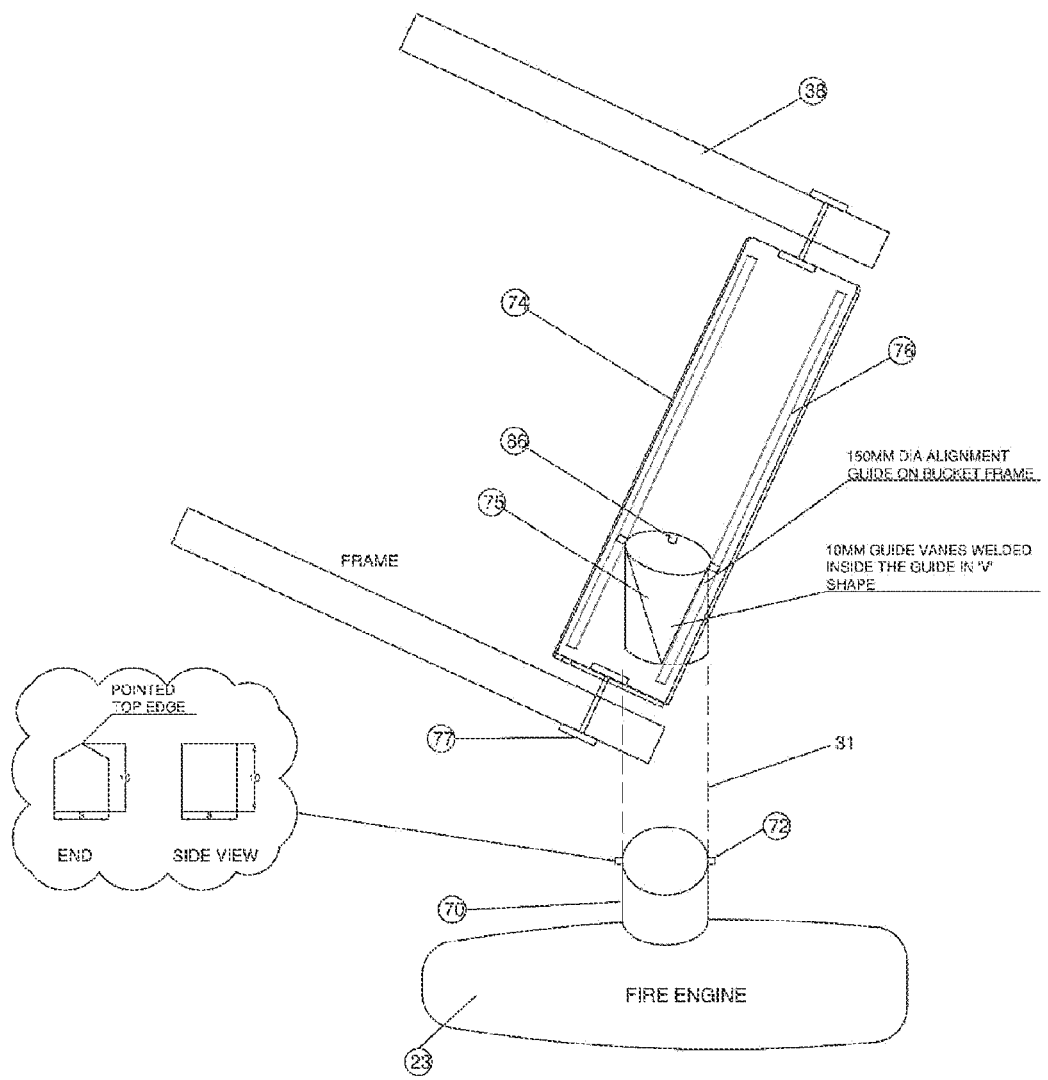
FIG. 8 is a schematic view of an alignment/guide system of the firefighting system of FIGS. 5 to 7.

The hose reel 36 may be fitted with an alignment/guide system to ensure that the fire engine (aerodynamic housing 23) axis is parallel to the helicopter 10 flight path when the hose 31 is wound before and after the firefighting operation and to allow self-spooling of the hose 31 on the hosereel 36. The alignment/guide system is shown schematically in FIG. 8. A circular flange 70 is mounted on the top surface of the aerodynamic housing 23. The hose 31 is attached to the circular flange 70 such that the housing 23 may be suspended by the hose 31 beneath the reservoir 15.

The flange 70 comprises two radially protruding fins 72 or tabs approximately 8 mm wide, 10 mm high and 8 mm thick. The hose 31 may be about 125 mm diameter thus the overall thickness of the flange 70 and fins 72 to about 141 mm. The skilled reader will appreciate that this is an example and the dimensions may vary.

An alignment/guide plate or guide frame 74 is mounted at the end of the supporting frames 38 through swivelling joints 77 which allow the pivotal movement or rotation of this plate 74 so that the hose 31 and aerodynamic housing 23 are always in the vertical direction. The alignment/guide plate 74 comprises a hollow guide pipe or tube 75 which can slide laterally or sideways in the two slots 76 during the hose winding/unwinding action to allow self spooling. The hollow guide pipe 75 may have a diameter of about 150 mm in the example described although the diameter of the hollow guide pipe 75 should be larger than the diameter of the hose 31. The hollow guide pipe 75 has a bull nosed bottom aperture or a slightly inclined bottom entry.

Figure 9:
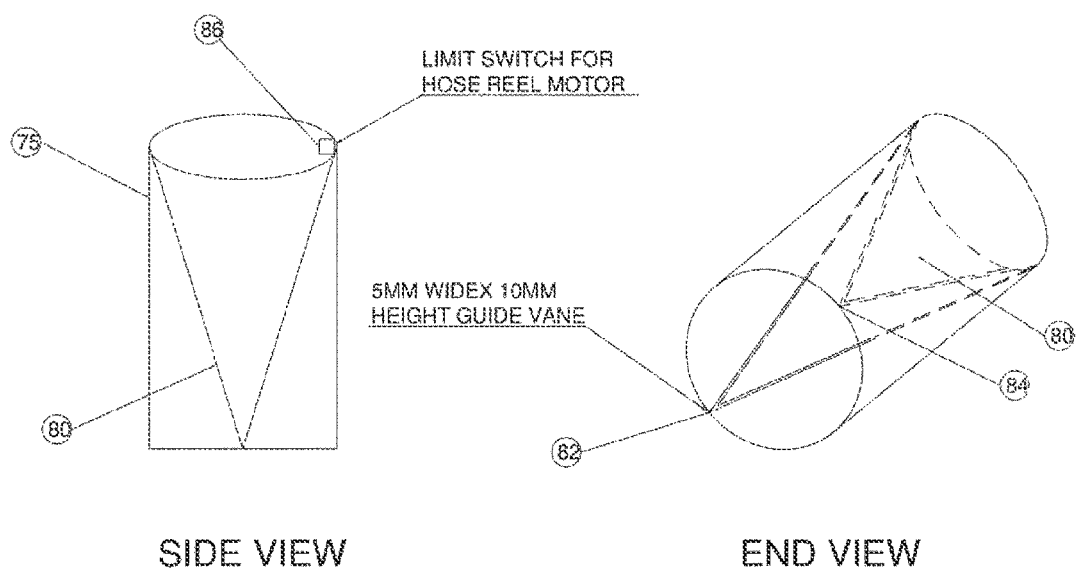
FIG. 9 is a detailed view of a guide tube of the alignment/guide system of FIG. 8.

FIG. 9 shows a detailed view of the hollow guide pipe 75. The hollow guide pipe 75 comprises two v-shaped vanes of thickness 10 mm protruding towards its centre and width 5 mm approximately. The vanes are joined to form pointed edges 82, 84 at the bottom of the hollow guide pipe 75 and extend upwardly and diverge until they reach the top end of the hollow guide pipe 75.

A limit switch 86 is located at the top of the hollow guide pipe 75 and is configured to stop the hose reel motor when the fin 72 hits the limit switch 86. The vanes 80 engage and guide the fins 72 as the hose reel 36 winds the flexible hose 31 to the stowed position such that the fins 72 contact the limit switch 86 and stops the hose reel 36 winding. The vanes 80 engage the fins 72 and guide them such that the fins 72 contact the limit switch 86 when the hose 31 is fully stowed. Beneficially, providing two fins 72 on the flange 70 ensures that the limit switch 86 is contacted even if the hose 31 is twisted and the aerodynamic housing 23 is facing a rearward direction.

When the reservoir 15 is empty the hose 31 is automatically emptied by gravity and then wound by the hose reel 36 to a stowed state as shown in FIG. 6 before the helicopter 10 commences normal flying and refilling operations. When the reservoir 15 is refilled and the helicopter 10 is in the vicinity of the fire the hose reel 36 unwinds the hose 31 such that water may be dispensed on the fire as shown in FIG. 5.

The firefighting system 14 of FIGS. 5 to 7 may be fitted with a DC power supply to provide power to the hose reel 36, the valves 40 and to the nozzle 24. The DC power supply may come from the helicopter 10 or from an independent battery module mounted on the supporting frame 35.

The nozzle 24 is housed in an aerodynamic module 23. The aerodynamic housing 23 is configured to provide a stabilised flight pattern for the nozzle 24. This is beneficial as it allows the nozzle 24 to be stabilised in flight such that the water being expelled from the nozzle 24 may be aimed more accurately on the fire.

The aerodynamic module 23 comprises outwardly extending fins or aerofoils 25 configured to stabilise the module 23 in flight. In use, the hose 31 is filled with water and is thus heavy, typically about 500 kg. As such, the hose 31 and firefighting system 14 are stable in flight, however, they may be subject to movement in response to gusts of wind. When the hose 31 moves due to wind the fins or aerofoils 25 generate counter forces to restore the stable flight of the firefighting system 14.

Figure 10:
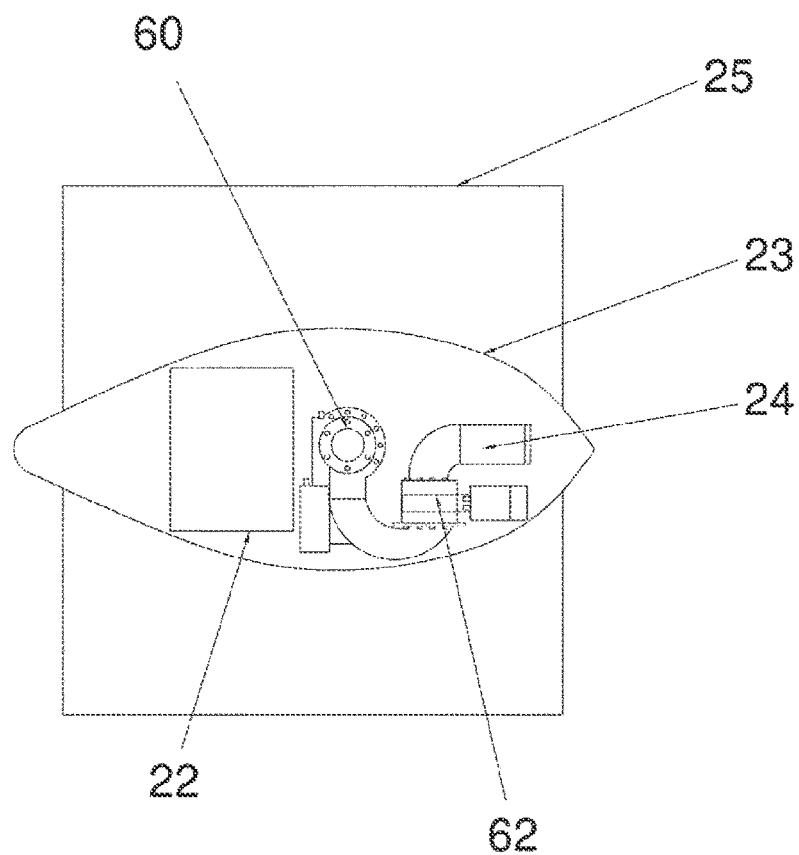
FIG. 10 is a plan view of a housing for housing the nozzle of the firefighting system of FIGS. 5 to 7.
Figure 11:
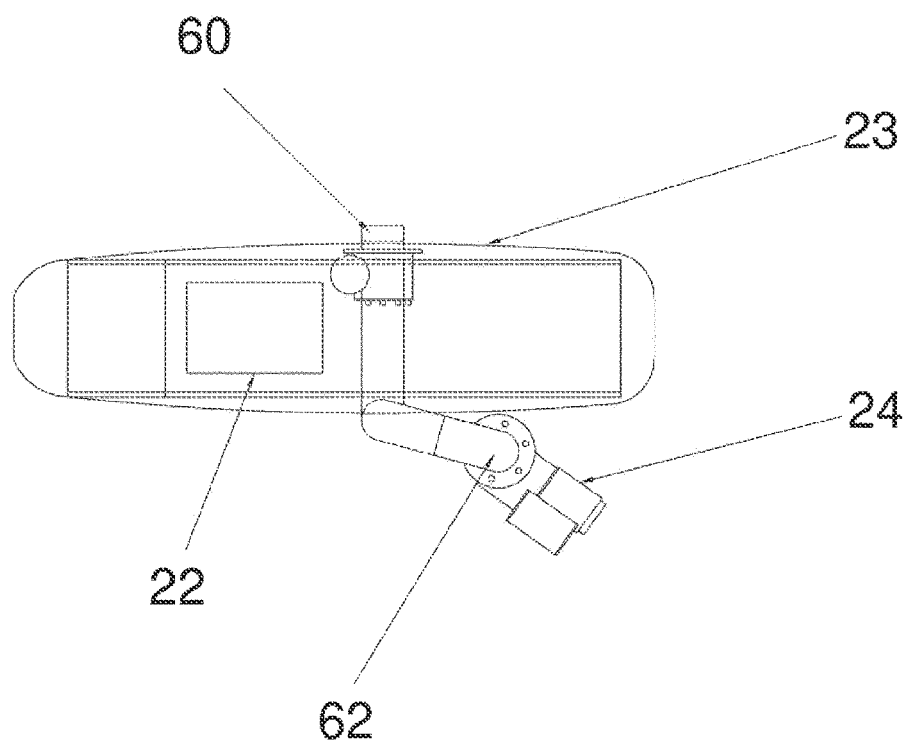
FIG. 11 is a side view of the housing of FIG. 10.
Figure 12:
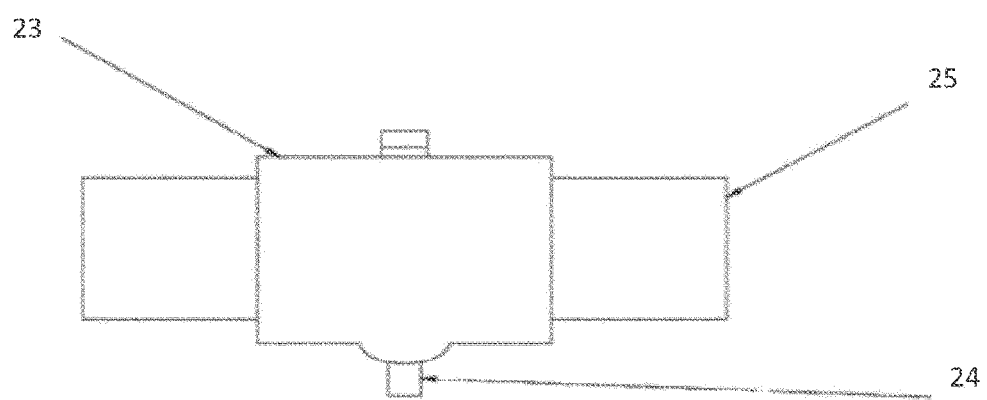
FIG. 12 is a front view of the housing of FIG. 10.

FIGS. 10 to 12 show a plan, a side and a front view of the aerodynamic module 23 and the nozzle 24 respectively. The nozzle 24 is articulated by two actuators 60, 62. The actuators 60, 62 may be rotational joints arranged on orthogonal axis to facilitate movement of the nozzle 24 on three-axis. This beneficially provides full control of the direction the water is distributed on the fire.

Figure 13:
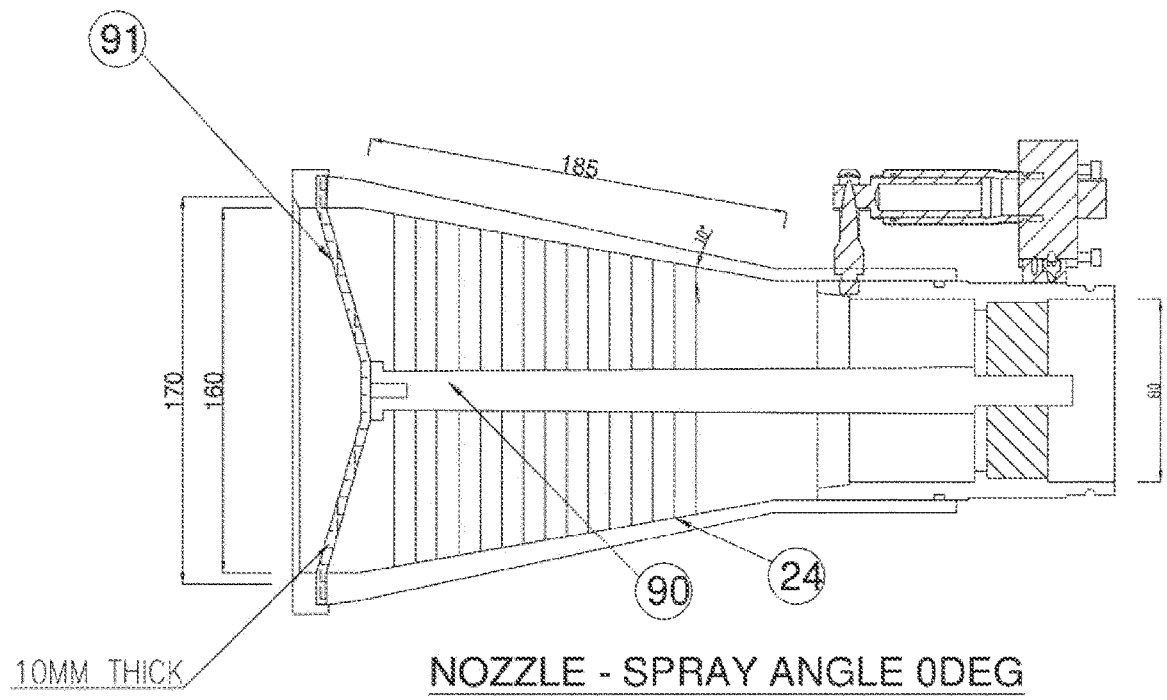
FIG. 13 is a detail of a remote control adjustable Rainmaker nozzle suitable for use with embodiments of the invention.

Turning now to FIG. 13 the nozzle 24 is shown in further detail. The nozzle 24 may comprise an actuator to actuate a sliding pin 90 for controlling the distribution pattern of water from the moveable nozzle 24. The sliding pin 90 is operable to vary the water distribution from the moveable nozzle 24. The moveable nozzle 24 may be a custom built nozzle 24 adapted to suit the system's pressure and flowrate and achieve the ideal variable jet pattern to suit different forest fire conditions.

Various nozzle outlets may be fitted on the nozzle 24 through the threaded connection provided at the open distal end of the nozzle 24. In one nozzle type, which is the current industry standard (not shown), the sliding pin 90 may be actuated to impede the flow of water leaving the nozzle 24 to vary the distribution pattern. When the sliding pin 90 is fully retracted, such that the pin 90 does not interrupt the flow of water, the pattern is a jet. When fully inserted into the nozzle 24 the distribution pattern is wider. Actuating the sliding pin 90 in this embodiment allows the distribution pattern to be varied.

FIG. 13 shows a nozzle 24 suitable for use with embodiments of the present disclosure. The nozzle 24 shown in FIG. 13 is configured to deliver a high flow rate of water as droplets on a target site and is known as a Rainmaker nozzle. As shown in FIG. 13, the sliding pin 90 may move distally or proximally along a central longitudinal axis of the nozzle 24 to control a perforated plate 91. The perforated plate 91 is positioned in the distal open end of the nozzle 24 and comprises a steel reinforced 10 mm thick rubber membrane with approximately 800 holes of 3 mm diameter. Water from the reservoir 15 may exit the nozzle 24 as droplets formed by the holes on the plate 91 to provide a rain effect with 30 litre/second flowrate at 3 Bar pressure. The sliding pin 90 is operable to vary or manipulate the position of the perforated plate 91 so as to alter the angle of distribution of the jet from zero to about twenty degrees. In an example this allows and covering areas from about 20 m² to 200 m² at 30 m nozzle height. This is anticipated to provide the ideal forest firefighting water distribution pattern.

The skilled reader will understand that the above nozzle 24 is an example and that a larger nozzle 24 shall provide higher flowrates of up to 50-60 litres per second as required in some applications. In this example the nozzle inlet size may be increased to, for example, 100 mm and the nozzle outlet diameter may be increased to approximately 300 mm with around 1200 to 1500, 4-6 mm diameter holes in the perforated plate 91 to suit helicopters 10 with 5000 or 10000 litre buckets in order to fight more intense forest fires.

Figure 14:
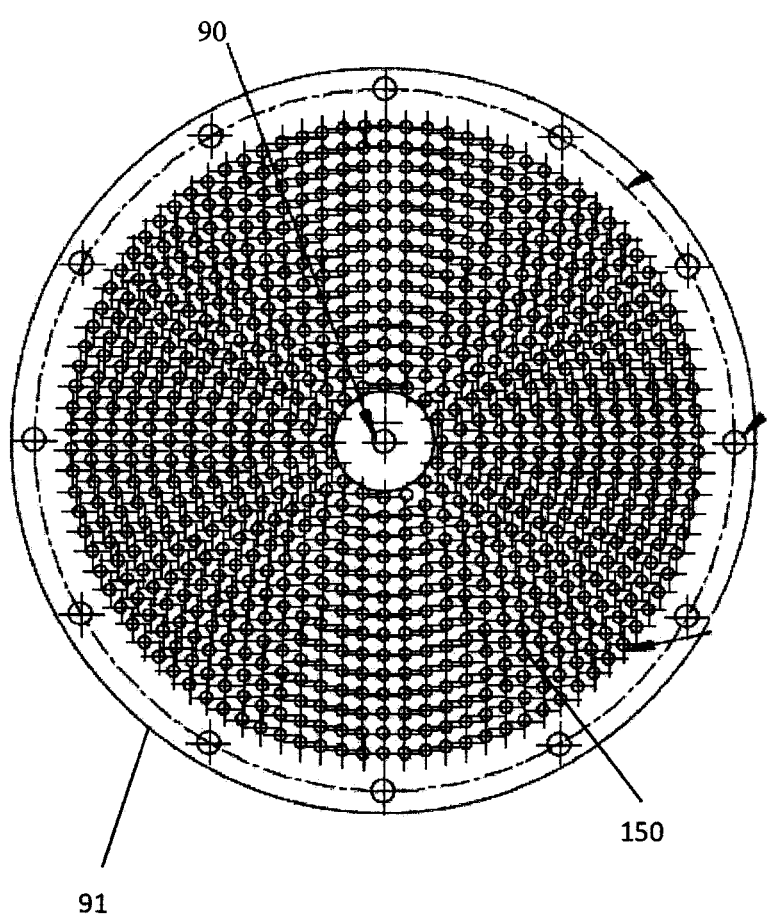
FIG. 14 is a view of a perforated plate for use with the nozzle of FIG. 13.

Turning now to FIG. 14 the perforated plate 91 is shown in further detail. The perforated plate 91 may be a circular disc having an array of apertures 150. The apertures 150 may be between 2 mm and 6 mm in diameter and the plate 91 may have up to 2000 holes depending on the application. The plate 91 may be a rubberised membrane that is reinforced by steel. The rubberised membrane beneficially allows the sliding pin 90 to manipulate the shape of the perforated plate 91. The pin 90 is connected to the centre of the perforated plate 91 and the outer circumference of the plate 91 is fixed to the nozzle 24 such that moving the sliding pin 90 longitudinally varies the profile of the plate 91 thereby varying the angle of water distribution from the nozzle 24.

Figure 15A:
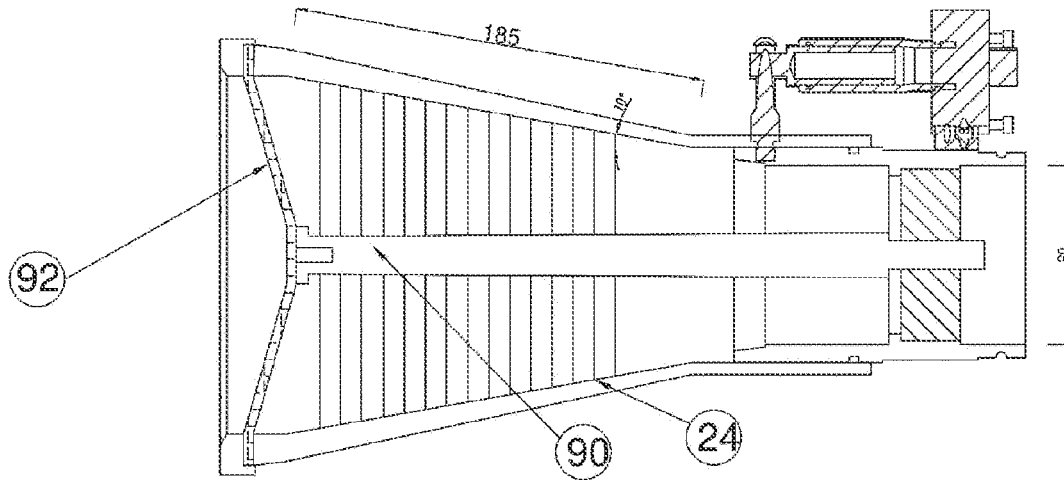
FIG. 15a is a side view of the nozzle of FIG. 13 with a sliding pin in a fully retracted position.
Figure 15B:
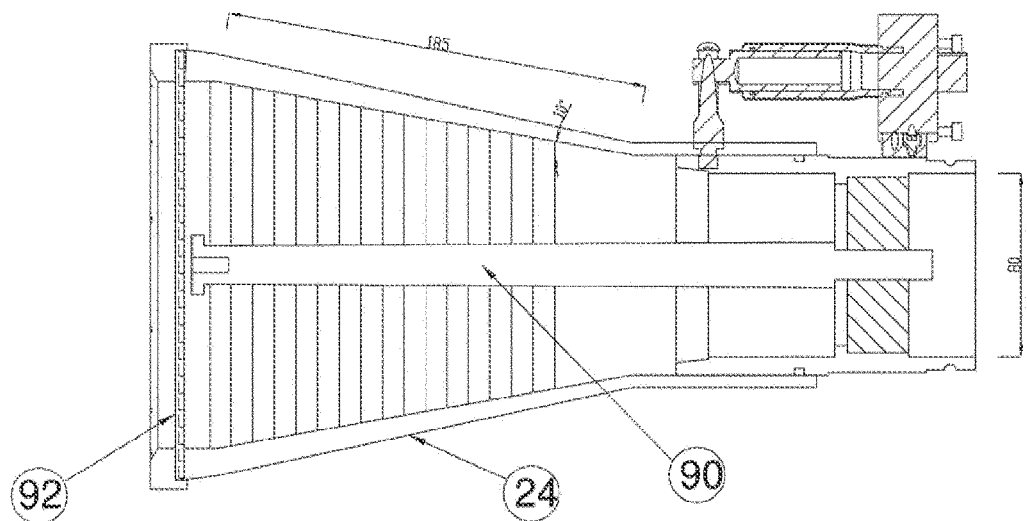
FIG. 15b is a side view of the nozzle of FIG. 13 with the sliding pin in a partially deployed position
Figure 15C:
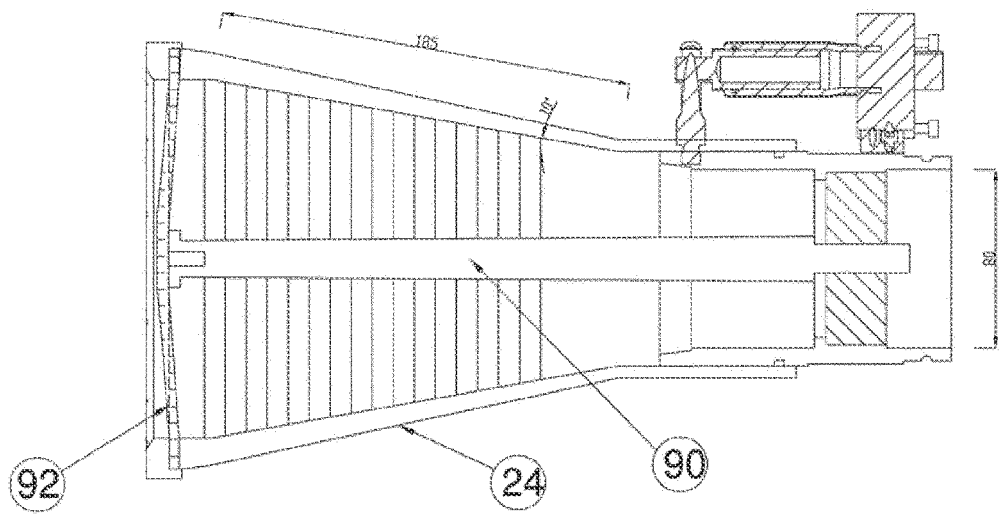
FIG. 15c is a side view of the nozzle of FIG. 13 with the sliding pin in a fully deployed position.

FIG. 15*a-c* shows a series of movements as the sliding pin 90 moves from a retracted position as shown in FIG. 15*a* to a fully deployed position as shown in FIG. 16*c*. In FIG. 15*a* the pin 90 is retracted such that the plate 91 is generally concave relative to the distal end of the nozzle 24 such that the spray angle of the flow of water is about 0 degrees.

In FIG. 15*b* the sliding pin 90 is in a partially deployed position. In the partially deployed position the plate 91 is substantially planar. This provides a spray distribution from the nozzle 24 of around 10 degrees. In FIG. 15*c* the sliding pin 90 is in the fully deployed position in which the plate 91 is convex. In this position the spray distribution from the nozzle may be around 20 degrees.

In another embodiment the perforated plate 91 may be a rectangular nozzle of 150×450 mm approx. size in order to better suit the longitudinal fire fronts. For such applications, the hose diameter may be increased to 125 mm to provide the additional flowrate and it's length may be increased to 40 m or more in order to generate higher hydrostatic pressures and allow the helicopters to fly at a higher, safer altitude.

Figure 16:
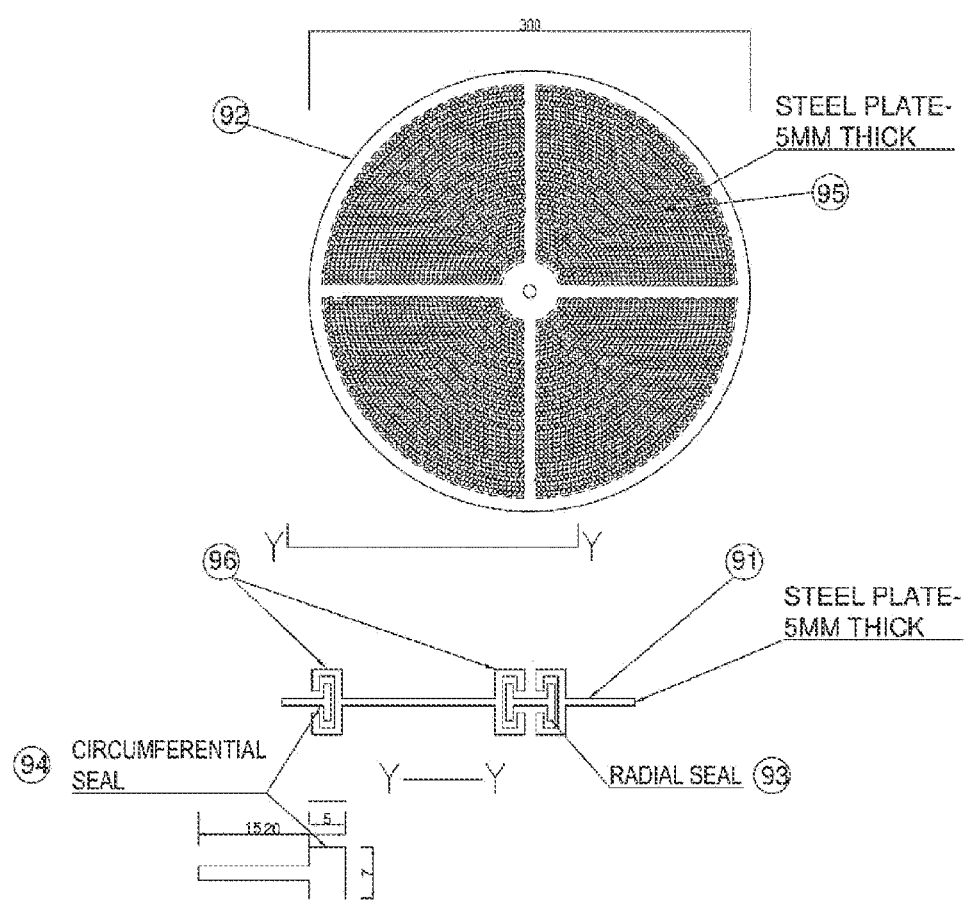
FIG. 16 is a view of a perforated plate for use with the nozzle of FIG. 13 according to another embodiment.

FIG. 16 shows an example of a plate 92 according to another embodiment. The skilled reader will understand that the plate 92 may be used with a circular or rectangular Rainmaker nozzle 24. The plate 92 shown in FIG. 16 comprises four stainless steel 5 mm thick quadrant plates 95 with perimeter channels 96 held together by radial seals 93 and circumferential seals 94 bolted on the nozzle outer section, as detailed in the drawing. The seals 93 allow the inward or outward movement of the four quadrants by the sliding pin 90 in order to achieve a remotely adjustable zero to twenty degrees rain effect from the nozzle 24. The plate 92 is suitable for use with a Rainmaker nozzle 24 that can achieve higher flowrates thus having a similar effect of heavy rain on the forest fire.

The above firefighting system will enable implementation of the ideal firefighting technique for many forest fires which is as follows:

The nozzle will usually aim towards the back of the helicopter flight path (which will ideally be into the prevailing wind) at an angle of about 30 degrees from the vertical axis in order to reduce the travel time and wind drag on the water droplets or rain jets which can lead to 40% water loss in the air. Through the camera, the operator will identify upcoming, more intense fire pockets and move the nozzle in advance to the opposite side of the vertical axis and maintain aiming at the target through the display cross hairs, thus enabling the application of higher water volumes on such areas.

Furthermore, with a 30 litres per second twenty degree rain effect and 30 m nozzle height, an area of 10 m in diameter will be covered, allowing coverage of about 6 m of the actual fire zone and 4 m of the forest which is not on fire, in order to stop spreading of the fire.

Assuming an average flowrate of 20 litres per second the total discharge time for a 3000 litre bucket 15 will be 150 seconds during which time the helicopter 10 can cover a fire front of 825 m length at 20 km/hr. Successive runs over persistent fire zones can then be implemented as required. When compared to the current practice which provides a non-uniform area coverage of about 70×20 m with a helicopter speed of 50 km/hr and a minimum water loss to the air of 30%, it can be seen that the effectiveness of the proposed firefighting system shall be multiple.

Furthermore, as a result of the above firefighting technique the locations of water refill reservoirs can be planned based on the number and types of available helicopters. For example, if three helicopters with 5000 litre tanks are available to combat a fire where one is above the fire, another is returning to a reservoir and the third one returning to the fire, the ideal reservoir spacing should be about 16 km if the helicopters 10 can fly at about 80 km/hr back and forth. Such reservoirs may be membrane lined ponds 10×20×4 m depth with a minimum useable capacity of 200 m$^3$ at the end of summer, constructed economically at any easily accessible, convenient stream bed location within mountainous areas. Providing universally spaced reservoirs within an area of vegetation beneficially provides opportunities to refill the helicopter firefighting system such that, when a team of three helicopters fights the fire, at least one helicopter may always be fighting the fire, thus implementing the concept of Flying Fire Engines. This scenario will substantially improve the overall effectiveness of aerial firefighting operations.

It will be appreciated that various changes and modifications can be made to the present disclosure without departing from the scope of the present application.

The invention claimed is:

1. An aerial firefighting system for a helicopter, the firefighting system comprising:
an external reservoir for storing water, wherein the external reservoir comprises a support frame and a water outlet, the support frame further comprising a hose reel connected to the water outlet and supporting a flexible hose, wherein the hose reel is configured for winding and unwinding the flexible hose between a stowed position and a deployed position and a horizontal rotational axis of the hose reel is moveable relative to the external reservoir when the flexible hose is being wound, the supporting frame being coupled to a lower edge and an upper edge of the external reservoir without protruding below it, through flanges with curved grooves to allow movement of the horizontal rotational axis of the hose reel when the flexible hose is being wound; and
a nozzle fluidly connected to the flexible hose;
wherein the nozzle is suspended by the flexible hose in fluid communication with the water outlet and the nozzle such that water being expelled from the nozzle is under hydrostatic pressure from water within the external reservoir; and
wherein the nozzle is moveable relative to the flexible hose about intersecting vertical and horizontal axes to direct a flow of water from the nozzle to a target site.

2. The aerial firefighting system as claimed in claim 1, wherein the nozzle is mounted within a stabiliser housing.

3. The aerial firefighting system as claimed in claim 2, wherein the stabiliser housing comprises at least one fin.

4. The aerial firefighting system as claimed in claim 1, wherein the flexible hose is retractable.

5. The aerial firefighting system as claimed in claim 1, wherein the external reservoir comprises a flexible membrane or a fuselage tank.

6. The aerial firefighting system as claimed in claim 5, comprising an alignment system for controlling the flexible hose during spooling.

7. The aerial firefighting system as claimed in claim 6, wherein the alignment system comprises a guide tube disposed around the flexible hose and wherein the guide tube is moveably mounted on a guide frame.

8. The aerial firefighting system as claimed in claim 7, wherein the guide frame is pivotably mounted to the supporting frame.

9. The aerial firefighting system as claimed in claim 7, wherein the guide tube comprises a location formation configured to engage a corresponding formation on the housing to inhibit rotational movement of the housing when in the stored position.

10. The aerial firefighting system as claimed in claim 9, wherein the location formation comprises a pair of vanes positioned within the guide tube and wherein the corresponding formation on the housing comprises a pair of tabs configured to follow a guide path defined between the pair of vanes.

11. The aerial firefighting system as claimed in claim 1, wherein the nozzle is operable from within the helicopter.

12. The aerial firefighting system as claimed in claim 1, comprising at least one flow control valve for controlling the flowrate of water from the nozzle.

13. The aerial firefighting system as claimed in claim 12, wherein the at least one flow control valve is positioned at a distal end of the flexible hose.

14. The aerial firefighting system as claimed in claim 12, wherein the at least one flow control valve is positioned at a proximal end of the flexible hose.

15. The aerial firefighting system as claimed in claim 12, comprising at least one flow control valve at each end of the flexible hose.

16. The aerial firefighting system as claimed in claim 1, wherein the nozzle is operable remotely to vary a distribution pattern of the flow of water.

17. The aerial firefighting system as claimed in claim 1, wherein the firefighting system comprises a camera interlocked with the nozzle such that the camera is directed in substantially the same direction as the nozzle, the camera being configured to view the flow of water from the nozzle and display an image of the fire on a display within the helicopter.

18. The aerial firefighting system as claimed in claim 17, wherein a target direction of the nozzle is displayed on the display.

19. The aerial firefighting system as claimed in claim 1, wherein the external reservoir is a membrane bucket suspended beneath the helicopter.

20. An aerial firefighting system for a helicopter, the firefighting system comprising:
an external reservoir for storing water, wherein the external reservoir comprises a flexible membrane or a fuselage tank with a support frame and a water outlet, the support frame further comprising a hose reel connected to the water outlet and supporting a flexible hose, wherein the hose reel is configured for winding and unwinding the flexible hose between a stowed position and a deployed position;
an alignment system for controlling the flexible hose during spooling, the alignment system comprising a guide tube disposed around the flexible hose and wherein the guide tube is moveably mounted on a guide frame; and
a nozzle fluidly connected to the flexible hose;

wherein the nozzle is suspended by the flexible hose in fluid communication with the water outlet and the nozzle such that water being expelled from the nozzle is under hydrostatic pressure from water within the external reservoir; and wherein the nozzle is moveable relative to the flexible hose about intersecting vertical and horizontal axes to direct a flow of water from the nozzle to a target site.

21. The aerial firefighting system as claimed in claim 20, wherein a horizontal rotational axis of the hose reel is moveable relative to the external reservoir when the flexible hose is being wound.

22. The aerial firefighting system as claimed in claim 21, wherein the supporting frame is coupled to a lower edge and an upper edge of the external reservoir without protruding below it, through flanges with curved grooves to allow movement of the horizontal rotational axis of the hose reel when the flexible hose is being wound.

\* \* \* \* \*